United States Patent

Iwatsuki

[11] Patent Number: 5,257,455
[45] Date of Patent: Nov. 2, 1993

[54] METHOD OF MAKING A TWO-PIECE/FULL FACE SHEET METAL DISK WHEEL

[75] Inventor: Keiji Iwatsuki, Okazaki, Japan

[73] Assignee: Central Motor Wheel Company Limited, Anjo, Japan

[21] Appl. No.: 857,324

[22] Filed: Mar. 25, 1992

[30] Foreign Application Priority Data

Mar. 26, 1991 [JP] Japan .................. 3-061437

[51] Int. Cl.$^5$ ............... B60B 3/02; B21D 53/26
[52] U.S. Cl. ................ 29/894.323; 301/63.1
[58] Field of Search .......... 29/894.322, 894.323; 228/135; 301/63.1, 64.3

[56] References Cited

U.S. PATENT DOCUMENTS 2,354,439  7/1944  Brink .
3,611,535  10/1971 Nobach .
4,610,482  9/1986  Overbeck et al. .......... 301/63.1

FOREIGN PATENT DOCUMENTS 0086740  2/1983  European Pat. Off. .
4018474  12/1991 Fed. Rep. of Germany .
64-90801  4/1989  Japan ................... 301/63.1
232040   4/1925  United Kingdom .

OTHER PUBLICATIONS

Patent Abstracts of Japan vol. 13, No. 282 (M-843) (3630) Jun. 28, 1989 & JP-A-01 078901 (Asahi Malleable Iron Co Ltd.) Mar. 24, 1989 *abstract*.

*Primary Examiner*—P. W. Echols
*Attorney, Agent, or Firm*—Pollock, Vande Sande & Priddy

[57] ABSTRACT

The present invention relates to a two-piece/full-face sheet metal disk wheel including a disk with a full-face structure which utilizes an outer peripheral portion of the disk as a front-side flange of a rim. This wheel includes the rim, and the disk having the outer peripheral portion radially separated into an outer portion and an inner portion, wherein the outer portion forms the front-side flange of the rim and the inner portion forms an engagement portion for the rim, and wherein the engagement portion is engaged with and welded at the position of an inner peripheral surface on an inner side of an outer-side bead seat of the rim.

4 Claims, 9 Drawing Sheets

F I G. 2
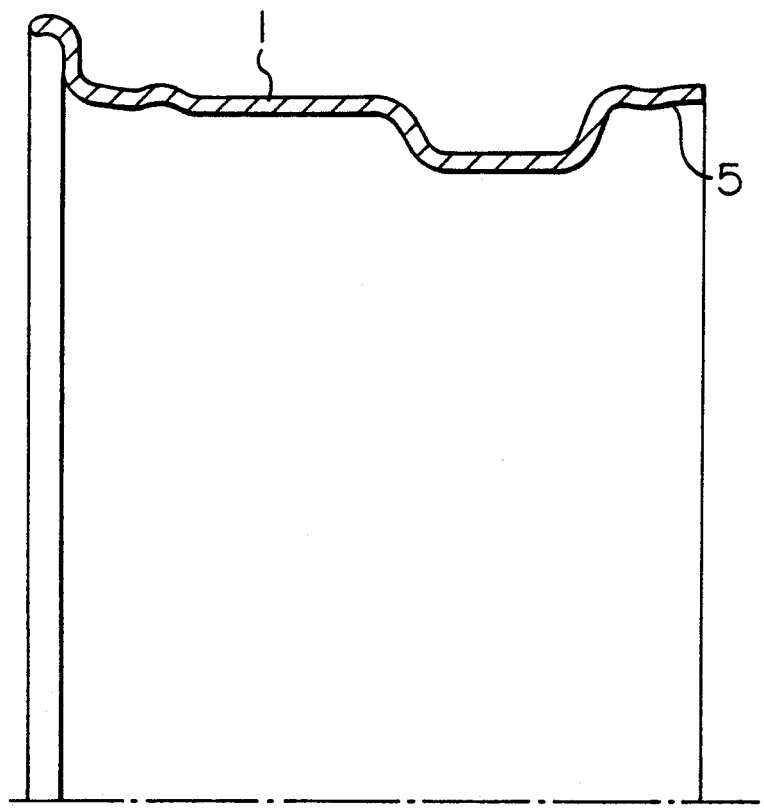

FIG. 3A
FIG. 3B
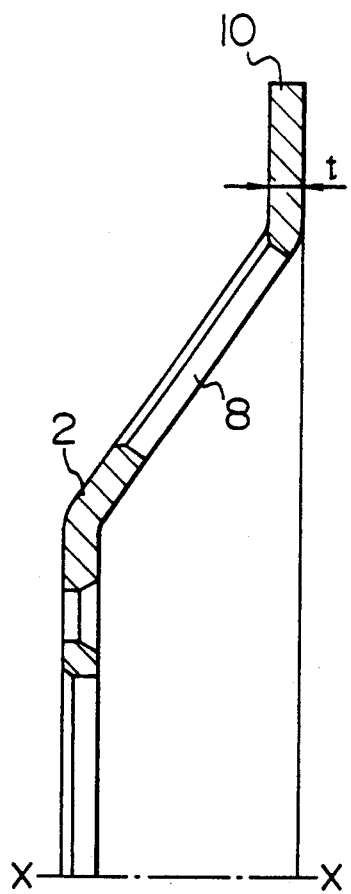
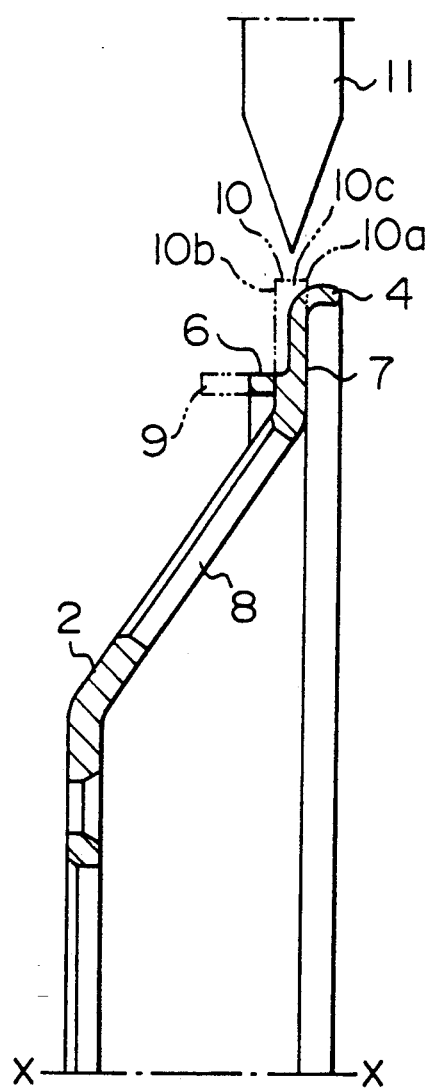

METHOD OF MAKING A TWO-PIECE/FULL FACE SHEET METAL DISK WHEEL

FIELD OF THE INVENTION

The present invention relates to a disk wheel for an automobile, and more particularly, to a two-piece/full-face sheet metal disk wheel.

BACKGROUND OF THE INVENTION

Two-piece/full face sheet metal disk wheels, each including a disk with a full face structure which utilizes an outer peripheral portion of the disk as a front-side flange of a rim, may be classified in two types such as an in-turned flange type and a male-female type.

The wheel of the former in-turned flange type generally includes an in-turned flange 15 for prevention of a decrease in strength of a rim portion by welding, as designated by reference numeral 14 in FIG. 5.

The two-piece/full face sheet metal disk wheel of the in-turned flange type is disclosed in U.S. Pat. No. 4,610,482, wherein an unsymmetrical rim 12 of a single-sided flange type as shown in FIG. 6 and a disk 13 illustrated in FIG. 7 are centered and fixed to each other by means of a temporary assembling fixture. Under such condition, the disk and the rim are welded to each other at a portion represented by the reference 14 in FIG. 5.

The unsymmetrical rim 12 of FIG. 6 is manufactured by means of the well-known conventional roll forming.

In the two-piece/full face sheet metal disk wheel of the latter male-female type, for the purpose of facilitating positioning when the rim and the disk are assembled and welded to each other, the rim and the disk are made to act as a male member and as a female member (the male-female type), respectively, and fitted to each other (see FIG. 8).

The rim 18 used in this male-female type two-piece/full face sheet metal disk wheel includes an engagement portion formed by cutting for removing a front-side flange portion 24 of the rim produced for use in the two-piece disk wheel by the well-known conventional roll forming, as illustrated in FIG. 9.

In the disk 19, as shown in FIG. 10, a portion indicated by reference numeral 25 of a plate material which has been pressed, is cut and removed to thereby form an engagement portion 22.

The engagement portion 22 of the disk 19 is fitted in the engagement portion 21 of the rim 18. Subsequently, the rim 18 and the disk 19 are welded to each other, as depicted by reference numeral 20. During welding, a fixture is used for fixedly retaining the rim 18 and the disk 19.

In the above-described prior art, the former example, that is, the two-piece/full face sheet metal disk wheel of the in-turned flange type has such advantages that a convex portion formed by weld metal can be minimized in size and that a sufficient depth of weld penetration and a welding strength can readily be ensured, because a V-groove is defined in the welding portion 14 between the rim 12 and the disk 13. On the other hand, however, it includes a serious deft since it is difficult to ensure an accuracy in positioning the axial centers of the rim 12 and the disk 13 by means of the fixture and to prevent distortion by heat during welding. As a result, it is also hard to steadily obtain accuracy of runout of the wheel.

In the latter example, that is, the two-piece/full face sheet metal disk wheel of the male-female type, because the engagement portion 21 of the rim 18 and the engagement portion 22 of the disk 19 respectively have small distances in a horizontal direction of the drawings, an engagement tolerance with a high accuracy is required in both engagement portions. More specifically, if they are too tight with respect to each other, they cannot often be engaged with each other. On the other hand, if they are loosely engaged with each other, a centering accuracy is decreased, so that distortion caused by heat during welding cannot be effectively prevented.

Also, this type of wheel has such problems that the fixture is required when assembling and welding the rim and the disk, and that a surface of the welding bead 20 must be finished by grinding.

Further, in the case where the V-groove is provided in the welding portion through cutting in order to reduce the welding bead to have a size as small as possible and to ensure the weld penetration, a defect of burn through is liable to occur during welding.

SUMMARY OF THE INVENTION

Therefore, it is an object of the present invention to provide a two-piece/full face sheet metal disk wheel which can solve the aforesaid problems of the prior art and a manufacturing method of the same.

In order to achieve the object, the present invention provides a two-piece/full face sheet metal disk wheel including a disk with a full-face structure which utilizes an outer peripheral portion of the disk as a front-side flange of a rim, wherein the wheel includes the rim and the disk having the outer peripheral portion radially divided separated into an outer portion and an inner portion, the outer portion forming the front-side flange of the rim and the inner portion forming an engagement portion for the rim, and wherein the engagement portion is engaged with and welded to an inner peripheral surface on an inner side of an outer-side bead seat of the rim.

In the two-piece/full face sheet metal disk wheel of the invention, it is more preferable that the outer peripheral portion of the disk is divided into the outer portion and the inner portion by a radial notching into the disk.

Further, in this two-piece/full face sheet metal disk wheel, it is more preferable that the engagement portion of the disk is engaged with and welded at the position of fitting end portion of the rim.

The present invention also provides a method of manufacturing a two-piece/full face sheet metal disk wheel including a disk with a full-face structure which utilizes an outer peripheral portion of the disk as a front-side flange of a rim, the method being characterized in that the outer peripheral surface of the disk is radially notched in order to divide the outer peripheral portion into an outer portion and an inner portion, that the outer portion forms the front-side flange of the rim and the inner portion forms an engagement portion for the rim, and that the engagement portion of the disk is engaged with and welded to an inner peripheral surface on an inner side of an outer-side bead seat of the rim, thereby manufacturing the two-piece/full face sheet metal disk wheel.

Further, the present invention provides a method of manufacturing a two-piece/full face sheet metal disk wheel including a disk with a full-face structure which utilizes an outer peripheral portion of the disk as a front-side flange of a rim, the method being characterized in that a flange portion of the disk is formed by bending during stamp-forming the disk, that one part of the flange portion is cut and removed for providing a stepped outer peripheral portion and a corner portion, that the corner portion is separated to form an engagement portion with the rim, and that the engagement portion is engaged with and welded to an inner peripheral surface on an inner side of an outer-side bead seat of the rim, thereby manufacturing the two-piece/full face sheet metal disk wheel.

In these manufacturing methods, it is more preferable that the engagement portion is engaged with and welded at the position of a fitting end portion of the rim.

BRIEF DESCRIPTION OF THE DRAWINGS

FIG. 2 is a vertically sectional view illustrative of an upper half of a rim used in the embodiment in FIG. 1;

FIGS. 3A and 3B are vertically sectional views each illustrating an upper half of a disk for use in the embodiment of the invention; FIG. 3A shows a configuration of the disk after being stamp-formed, and FIG. 3B shows a configuration of the disk after the outer peripheral portion of the disk is divided into an outer portion and an inner portion and the outer portion is formed into a flange portion and the inner portion is formed into an engagement portion;

FIG. 4A is a vertically sectional view of an upper half of the disk after being stamp-formed and subsequently being cut partially, and FIG. 4B is a vertically sectional view of the same after one part of the outer peripheral portion of the disk is separated and formed into an engagement portion;

DETAILED DESCRIPTION OF THE PREFERRED EMBODIMENTS

Structures and functions of the present invention will be explained below more in detail, with reference to preferred embodiments of the invention.

Figure 1:
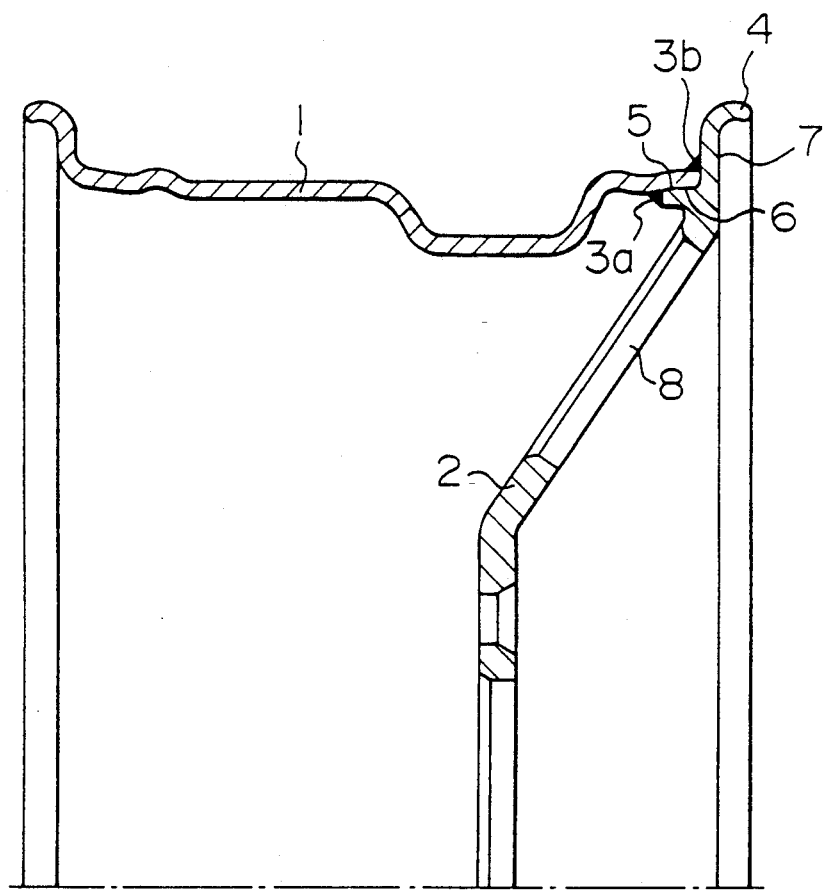
FIG. 1 is a vertically sectional view showing an upper half of a two-piece/full face sheet metal disk wheel of one embodiment according to the present invention.

Referring to FIGS. 1 to 3, reference numeral 1 designates a rim, reference 2 indicates a disk with a full-face structure which utilizes its outer peripheral portion as a front-side flange of the rim, and references 3a and 3b show welding portions between the rim 1 and the disk 2, respectively.

The rim 1 is an unsymmetrical rim, as shown in FIG. 2. A fitting end portion 5 on an inner side of a rim bead seat is formed to have a tapered angle of 5°.

The disk 2 is formed in a manner discussed below. At first, a sheet metal material having a thickness of t is stamp-formed into a shape of FIG. 3A and an outer peripheral portion 10 of the disk is formed into a plate-like shape extending in a direction perpendicular to the axial line X—X of the disk. Subsequently, as shown in FIG. 3B, a separating roll 11 is brought into contact with the outer peripheral portion 10 to provide a notch 10c extending in the radial direction of the disk for dividing the outer peripheral portion 10 into an outer portion 10a and an inner portion 10b. When the notch 10c extends to a certain degree of depth, the separating roll 11 is replaced by a roll having a different configuration for dividing the outer peripheral portion more deeply as well as rolling the outer portion 10a in order to form a front-side flange designated by reference numeral 4. The inner portion 10b is thinned by spinning to be bent leftward in the drawing, to thereby form an engagement portion 6. The disk engagement portion 6 is formed to have a certain overlap width and insertion pressure between a fitting portion 5 on an inner side of the rim bead seat and itself. An unnecessary portion 9 of the disk is cut away.

The engagement portion 6 of the full-face disk 2 is press-fitted in the fitting end portion 5 on the inner side of the bead seat of the rim 1. Thereafter, as indicated by reference 3a in FIG. 1, the rim 1 and the disk 2 are welded to each other between the inner peripheral surface and a cut end face (the innermost welding portion in the drawing) of the engagement portion 6. As occasion demands, a sealing compound is coated on the fitting end of the rim 1.

In case of executing Ni-Cr plating for improvement of decoration design, the plating processing is carried out in the state of the disk sole body illustrated in FIG. 3B. After subjecting the disk sole body to the plating processing, even if the disk 2 is engaged with and welded to the rim 1 as shown in FIG. 1, because there is a sufficiently long distance from the welding portion 3a to a disk decorative surface 7, a plating film on the disk decorative surface 7 is not peeled nor discolored due to an influence by heat during welding.

When it is required to further increase a strength resulted from the welding portion 3a, the rim 1 and the disk 2 are welded to each other at another fitting end portion of the rim 1 represented by reference 3b.

Figure 4A:
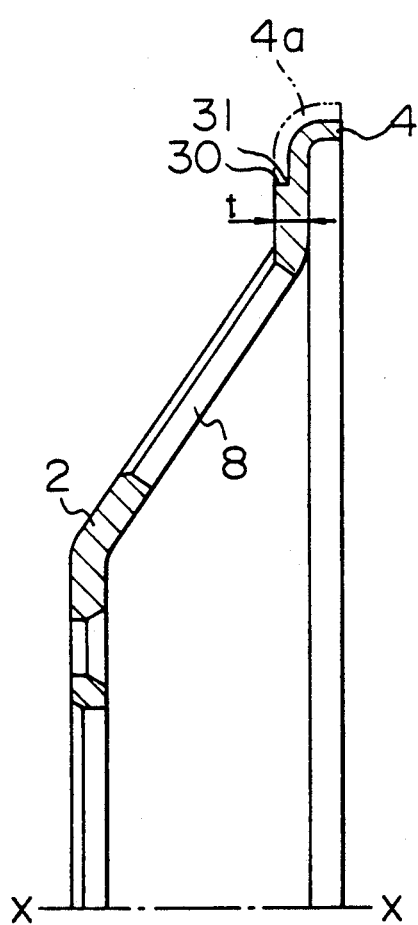
FIGS. 4A and 4B indicate a modified example of the embodiment of the invention in FIGS. 3A and 3B.
Figure 4B:
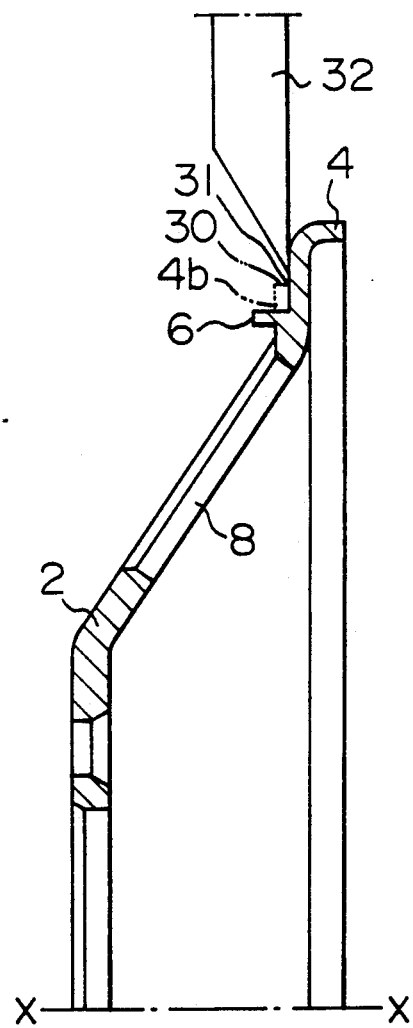
Figure 5:
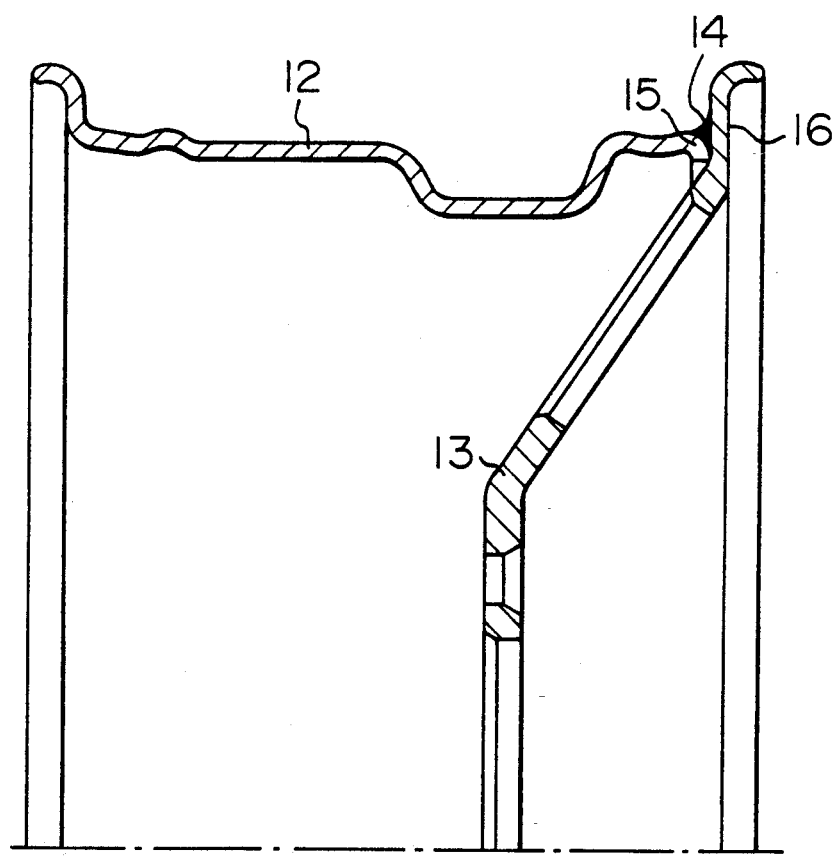
FIG. 5 is a vertically sectional view showing an upper half of a two-piece/full face sheet metal disk wheel which is one example of the prior art.
Figure 6:
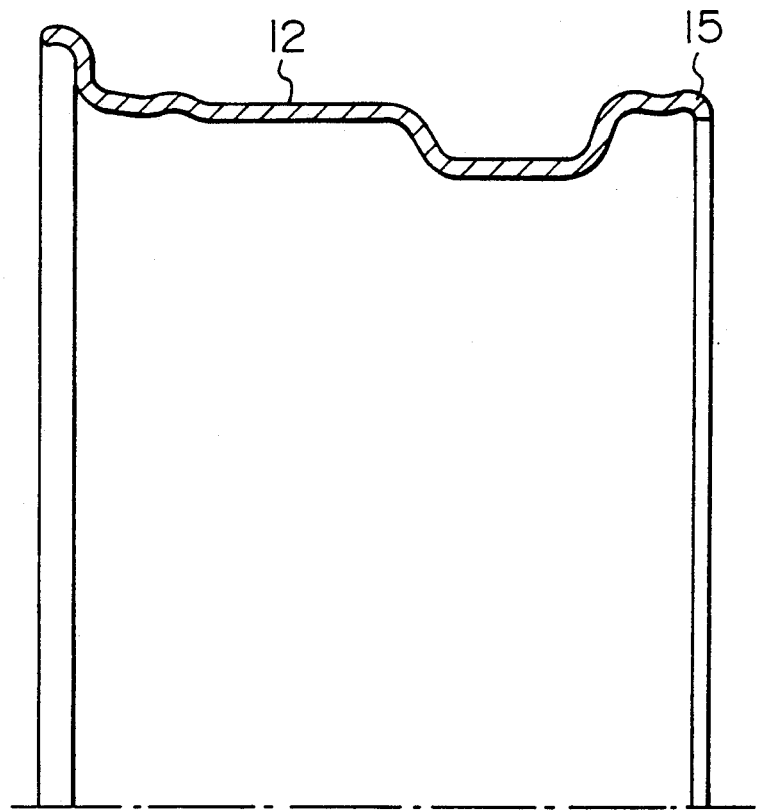
FIG. 6 is a vertically sectional view illustrative of an upper half of a rim used in the prior example of FIG. 5.
Figure 7:
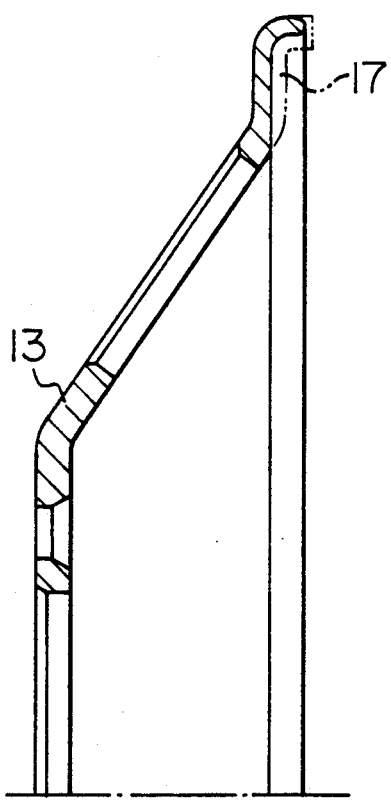
FIG. 7 is a vertically sectional view illustrative of an upper half of a disk for use in the prior art example of FIG. 5.
Figure 10:
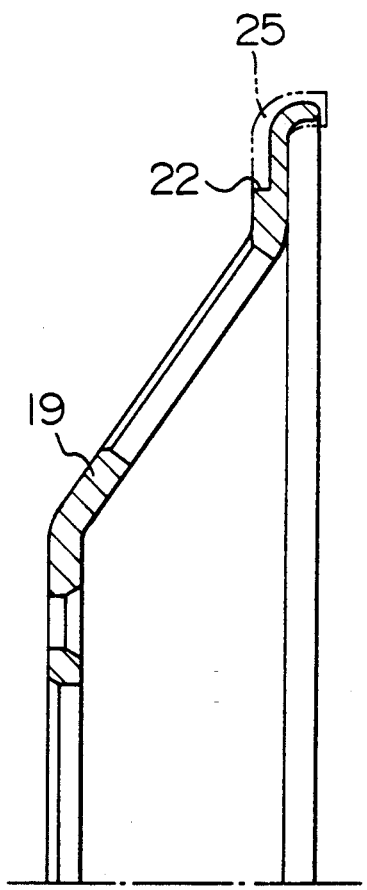
FIG. 10 is a vertically sectional view of a disk used in the prior example of FIG. 8.
Figure 8:
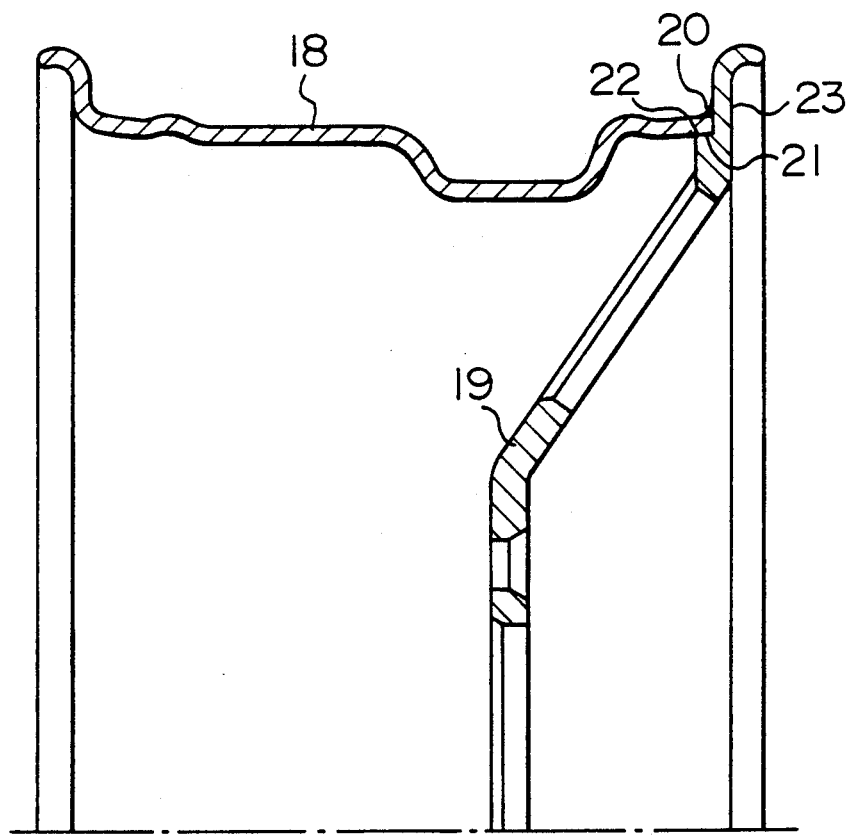
FIG. 8 is a vertically sectional view indicating an upper half of a two-piece/full face sheet metal disk wheel which is another example of the prior art.
Figure 9:
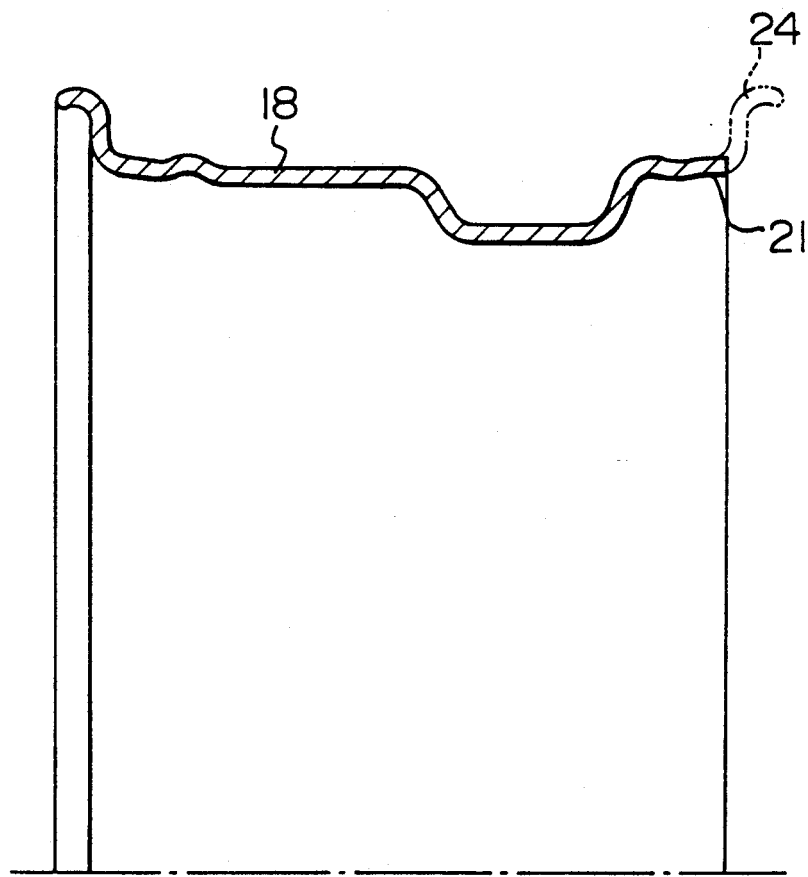
FIG. 9 is a vertically sectional view illustrating an upper half of a rim used in the prior example of FIG. 8.

FIGS. 4A and 4B show a modified example of the embodiment of the invention illustrated in FIGS. 3A and 3B. Referring to FIG. 4A, a disk 2 is provided with a flange portion 4 having a thickness t and formed by bending during stamp-forming the disk. Then, one part 4a of the flange portion 4 is cut and removed, thereby forming a stepped outer peripheral portion 30 and a corner portion 31. Subsequently, a roller 32 is brought into contact with the corner portion 31 indicated in FIG. 4B in order to separate another part 4b of the flange portion 4 from the flange portion, thereby forming an engagement portion 6 with respect to the rim 1.

An object and effect of this modified example are similar to those of the above-described embodiment of the invention.

Additionally, since the flange portion 4 is formed by bending during drawing in the modified example, a spring-back phenomenon during stamp-forming the disk is repressed so that an accuracy in flatness can readily be ensured.

Because the two-piece/full face sheet metal disk wheel according to the invention is constructed and produced in the aforesaid manner, a sufficient large distance of engagement between the rim and the disk can be obtained. As a result, a large overlap width and high insertion pressure between the rim and the disk can be attained, which eliminates a necessity for a centering fixture when assembling and welding the rim and the disk. A deterioration of accuracy in assembling and welding the rim and disk by an error of the fixture is not caused so that the wheel can be easily mass-produced. Thermal deformation during welding, particularly, at the rim and the front-side flange portion which are liable to be deformed, can be prevented. Further, the portion 3b can be welded preferably without causing any defect such as burn through of the rim 1, thanks to an existence of the disk engagement portion 6.

What is claimed is:

1. A method of manufacturing a two-piece/full-face sheet metal disk wheel including a disk with a full-face structure which utilizes an outer peripheral portion of the disk as a front-side flange of a rim, said method comprising radially notching the outer peripheral surface of the disk to radially divide the outer peripheral portion of the disk to form an outer portion and an inner portion, such that said outer portion forms the front-side flange of the rim and said inner portion forms an engagement portion and engaging and welding said engagement portion to an inner peripheral surface on an inner side of an outer-side bead seat of the rim.

2. A method of manufacturing a two-piece/full-face sheet metal disk wheel according to claim 1, wherein said engagement portion is engaged with and welded at a position of a fitting end portion of the rim.

3. A method of manufacturing a two-piece/full-face sheet metal disk wheel including a disk with a full-face structure which utilizes an outer peripheral portion of the disk as a front-side flange of a rim, said method comprising the steps of:

prebending the outer peripheral portion of the disk for forming said flange portion, and then cutting and removing one part of said flange portion for providing a stepped outer peripheral portion and a corner portion, separating the corner portion to form an engagement portion with said rim, engaging welding said engagement portion to an inner peripheral surface on an inner side of an outer-side bead seat of the rim.

4. A method of manufacturing a two-piece/full-face sheet metal disk wheel according to claim 3, wherein said engagement portion is engaged with and welded at a position of a fitting end portion of the rim.

* * * * *